United States Patent [19]

Shirdavani

[11] Patent Number: 4,894,153
[45] Date of Patent: Jan. 16, 1990

[54] MAGNETIC ATTACHMENT FOR A FILTER

[76] Inventor: Hossain A. Shirdavani, 14425 NE. 37th Pl., Apt. G6, Bellevue, Wash. 98007

[21] Appl. No.: 276,529
[22] Filed: Nov. 28, 1988
[51] Int. Cl.⁴ .............................................. B01D 35/06
[52] U.S. Cl. .................................... 210/222; 184/6.25; 335/305; 210/251; 210/541
[58] Field of Search ................ 210/222, 223, 232, 251, 210/541; 123/169 A; 184/6.25; 335/305

[56] References Cited

U.S. PATENT DOCUMENTS

| | | | |
|---|---|---|---|
| 2,014,800 | 9/1935 | Deguenther | 210/317 |
| 2,838,179 | 6/1958 | Thomas | 210/222 |
| 2,860,787 | 11/1958 | Pieper et al. | 210/223 |
| 2,980,257 | 4/1961 | Paton | 210/223 |
| 3,460,679 | 8/1969 | Llewellyn | 335/305 |
| 3,480,145 | 11/1969 | Gladden | 210/223 |
| 3,840,045 | 10/1974 | Grosseau | 137/495 |
| 4,450,075 | 5/1984 | Krow | 210/223 |
| 4,629,550 | 12/1986 | Döhler et al. | 208/60 |
| 4,629,558 | 12/1986 | Garritty | 210/222 |

FOREIGN PATENT DOCUMENTS

| | | |
|---|---|---|
| 478770 | 6/1929 | Fed. Rep. of Germany . |
| 210223 | of 0000 | Fed. Rep. of Germany . |
| 5511365 | 12/1976 | Japan .................................. 210/222 |
| 557214 | of 0000 | United Kingdom . |

*Primary Examiner*—W. Gary Jones
*Assistant Examiner*—Matthew O. Savage
*Attorney, Agent, or Firm*—Robert W. Jenny

[57] ABSTRACT

A plurality of magnets are detachably attached to the exterior of the cylindrical casing of a liquid filter unit to attract and capture ferromagnetic particles from the fluid, particles too small to be captured by the basic filtering element but large enough to cause further harm if allowed to remain free in the liquid. The magnets are magnetized such that their ends are north or south poles and shaped so that the ends are in close, positive contact with the casing. The attachment apparatus comprises springs interconnecting the magents and links and springs to position the magnets in the lengthwise direction of the casing.

2 Claims, 1 Drawing Sheet

MAGNETIC ATTACHMENT FOR A FILTER

BACKGROUND OF THE INVENTION

1. FIELD

The subject invention is in the field of filters used for removing particles from liquid flowing through the filters. More particularly it is in the field of filters intended for use with liquids in which ferromagnetic particles are entrained or suspended, such as the lubricating oil in internal combustion engines. Such particles are worn off the ferromagnetic parts of the engine during use and entrained in the lubricating liquid. The filters commonly used in the lubrication systems of internal combustion engines capture some of the particles and thus prevent them from possibly causing further wearing of the lubricated parts but it is well known in the art that filters able to capture the particles at the small end of the size range of such particles by filtering action are too cumbersome and expensive to be commercially successful. It is known to be possible to capture the smaller ferromagnetic particles by placing magnetic components in the filters as shown in the known prior art to the subject invention.

2. PRIOR ART.

Filters incorporating magnetic elements for the purpose of capturing ferromagnetic particles too small to be captured by the filtering elements are shown in the following patents:

| U.S. Pat. Nos. | | British |
|---|---|---|
| 2,014,800 | 2,980,257 | 557,214 |
| 2,838,179 | 3,840,045 | |
| 2,860,787 | 4,450,075 | German |
| 4,629,558 | | 478,770 |

None of the prior art apparatus for removing small ferromagnetic particles from lubricating oil are known to be commercially successful. One of the primary reasons for this lack of success is believed to be that the cost of the filters incorporating the magnetic means could not be justified in terms of tangible evidence of the economic benefits of using them. Therefore, the problem leading to the subject invention was provision of filtering apparatus which effectively captures small ferromagnetic particles in liquids and which does so at less cost than the known prior art apparatus provided for that purpose. Accordingly it is an objective of the subject invention to provide apparatus for capturing ferromagnetic particles in liquids, the cost of using such apparatus to be minimal. It is evident from the following descriptions that the cost minimization is achieved in part because the apparatus is reusable, being transferable from filter to filter and therefore a second objective of the subject invention is that it be separable from the filter apparatus with which it is used and repeatedly reusable on other filters.

SUMMARY OF THE INVENTION

The invention comprises a plurality of magnets detachably attached to the exterior of the conventional oil filters used on internal combustion engines. The effects of the magnets penetrate the casing of a filter and cause ferromagnetic particles entrained in the fluid flowing through the filter to be attracted to the inner surface of the casing and thus captured, preventing their further circulation in the lubricating liquid in the engine and thereby augmenting the function of the filter. In a preferred embodiment the magnets are rectangular segments of a cylinder with the inside diameter of the cylinder slightly smaller than the outside diameter of the cylindrical casing of the filter. The magnets are held against the casing by attachment apparatus described below, with the inside diameter surfaces of the magnets nested against the surface of the casing. The magnets are located spaced apart in a line around the casing. The ends of each magnet contact the casing because of the diameter difference stated above. The magnets are located relative to each other and held in place by tension springs interconnecting them. Clips and additional springs are used to position the springs and magnets at a position along the length of the casing and to maintain them in that position. The magnets are magnetized so that the ends of each magnet contacting the casing are a north and a south pole. The magnetic fields of the magnets attract and capture ferromagnetic particles in the liquid in the filter, particles too small to be captured by the filter itself but large enough to cause further engine wear if allowed to continue to circulate with the lubricating liquid.

The invention is described in more detail below with reference to the attached drawings.

DETAILED DESCRIPTION OF THE INVENTION

Figure 1:
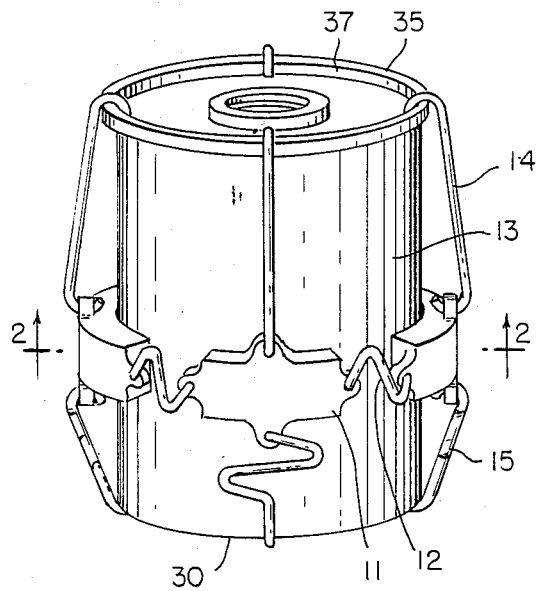
FIG. 1 is a perspective view of a conventional oil filter equipped with the invention.

The invention comprises a plurality of magnets detachably attachable to the exterior of a filter used, for example, in the lubricating system of an internal combustion engine. The fields of the magnets attract and capture ferromagnetic particles in the lubricating liquid too small to be captured by the filter apparatus itself but large enough to cause additional wear of parts if allowed to continue circulating with the fluid. FIG. 1 illustrates an oil filter of the type used on internal combustion engines, the filter being fitted with the subject invention. The invention comprises a plurality of permanent magnets, of which magnet 11 is typical. The magnets are interconnected by a plurality of springs, spring 12 being typical and positioned in series around the exterior of the casing 13 of the filter. The ring of magnets is positioned lengthwise of the filter by pluralities of links and springs described in more detail below, link 14 and spring 15 being typical.

Figure 2:
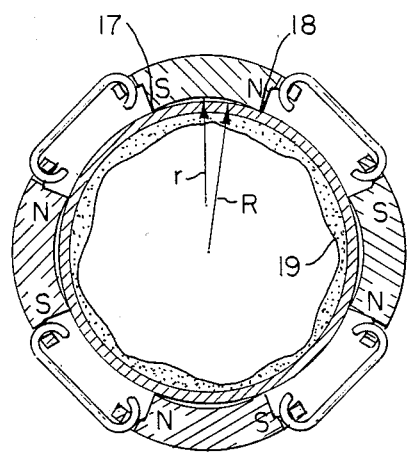
FIG. 2 is a sectional view taken at 2—2 in FIG. 1.

The function of the invention is shown in FIG. 2, a sectional view taken at 2—2 in FIG. 1. As shown, the magnets are curved to conform to the cylindrical shape of the filter casing. However, the inner radius r of each magnet is smaller than the radius R of the external surface of the casing. As a result the magnets contact the casing at their ends, ends 17 and 18 being typical. The magnets are magnetized such that their ends are north and south poles respectively as indicated by the letters S and N on each magnet.

With the magnets positioned as described their fields attract and capture deposits of ferromagnetic particles, deposit 19 being typical, thus serving the primary purpose of the invention.

Figure 3:
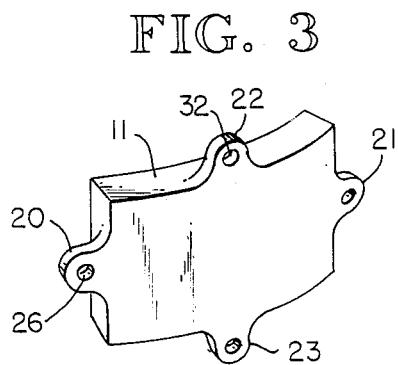
FIG. 3 illustrates a magnet in detail.

FIG. 3 illustrates a magnet in detail. The magnet 11 is a rectangular block curved as shown in FIG. 2. Tabs 20 and 21 are used for interconnection of the magnets by springs and tabs 22 and 23 are used in locating the magnets in a position lengthwise of the filter.

Figure 4:
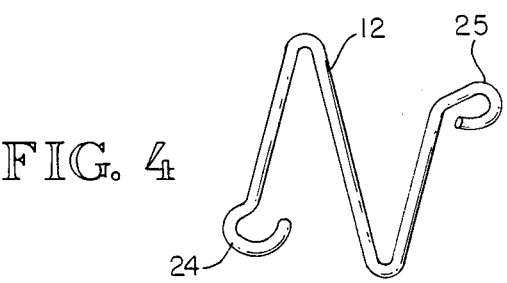
FIG. 4 is a perspective view of the spring used to interconnect the magnets.

FIG. 4 illustrates an interconnection spring 12. Hooks 24 and 25 are inserted through holes in the appropriate tabs on the magnets, hole 26 (FIG. 3) being typical, and closed to prevent inadvertent detachment of the springs from the magnets. The magnets are thus connected in series.

Figure 5:
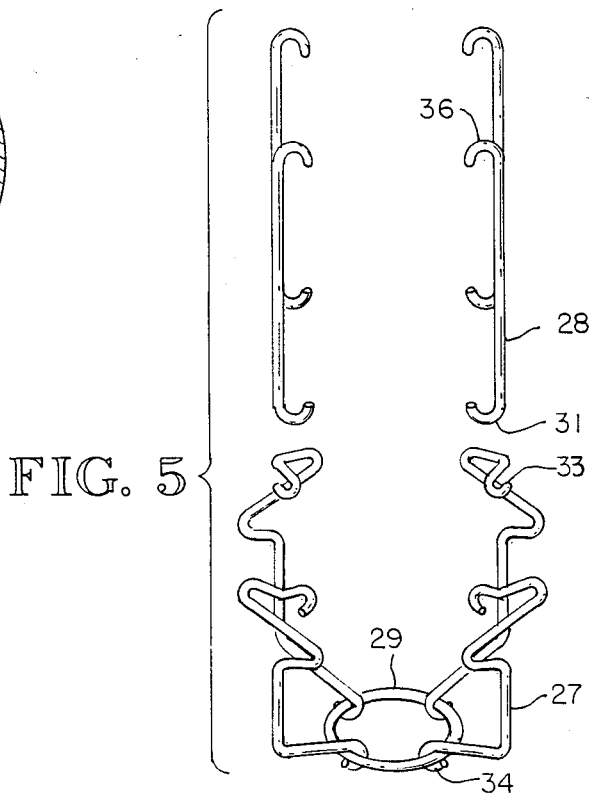
FIG. 5 is a perspective view of the springs and related apparatus used in positioning the magnets lengthwise on the filter casing.

FIG. 5 illustrates the springs and related apparatus used in positioning the series of magnets lengthwise on the filter casing. The apparatus comprises pluralities of springs and links, spring 27 and link 28 being typical, and a ring 29 positioned at the center (not visible) of bottom 30 (FIG. 1). Hook 31 on link 28 is inserted through hole 32 (FIG. 3) and closed to prevent inadvertent disconnection. Hook 33 on spring 27 is similarly connected to tab 23 (FIG. 3) and hook 34 is connected to ring 29. With the apparatus thus connected the magnets are installed on the filter by placing the series of magnets around the casing, extending the interconnecting springs in the process and sliding the ring of magnets toward the top end 35 (in FIG. 1) until hook(s) 36 of link(s) 28 hook over rim 37 (in FIG. 1), stretching spring(s) 27 in the process. The magnets are thus in position to serve their stated purpose. The cost of using the same magnets to assist the filtering action on many filters is lower than providing equivalent magnets in each filter.

It is believed to be clear from this description that the invention meets it objectives. The apparatus is transferable from filter to filter and thus provides the supplementary filtering benefits at costs lower than the cost of providing supplementary filtering capability in each filter.

It is also believed to be understandable by those skilled in the art that while one embodiment of the invention is described herein, other embodiments and modifications of the one described are possible within the scope of the invention which is limited only by the appended claims.

What is claimed is:

1. Apparatus for augmenting the function of a filter for liquids, said filter having a casing, a top rim, a length and a bottom having a center, said apparatus comprising:

a plurality of magnets,
   first springs interconnecting said magnets,
   links connecting said magnets to said top rim,
   a ring positioned at said center of said bottom and
   second springs interconnecting said magnets to said ring, whereby said first springs position said magnets around said casing and said links, ring and second springs position said magnets along said length on said casing.

2. The apparatus of claim 1 in which each of said plurality of magnets has a first end and a second end and is shaped such that when said magnet is placed against said casing magnet contacts said casing at said first and second ends.

* * * * *